UNITED STATES PATENT OFFICE.

BENJAMIN R. BEALL, OF KANSAS CITY, MISSOURI.

METHOD OF TREATING EXCELSIOR.

1,389,340.   Specification of Letters Patent.   Patented Aug. 30, 1921.

No Drawing.   Application filed June 11, 1920.   Serial No. 388,374.

*To all whom it may concern:*

Be it known that I, BENJAMIN R. BEALL, a citizen of the United States, residing at Kansas City, in the county of Jackson and State of Missouri, have invented certain new and useful Improvements in Methods of Treating Excelsior; and I do declare the following to be a full, clear, and exact description of the invention, such as will enable others skilled in the art to which it appertains to make and use the same.

This invention relates to a method of treating excelsior to reduce its bacteria count and prevent formation of mold and must germs therein.

As is well understood, excelsior is a commonly utilized packing for all kinds of merchandise and particularly adaptable for protecting food products, such as butter, eggs and white flour loads during shipment, subject to the objection that excelsior in its natural state has a tendency to spontaneous combustion induced by the formation of mold and must germs and their decomposition.

I have found that by treating the excelsior with an absorbent, for example, calcium oxy chlorid, sulfite, either bi-sulfite or hypo-sulfite of soda, the mold and must germs are killed and the bacteria may be reduced to not exceed one hundred twenty-five thousand to the gram, and in actual practice I have found that about two ounces of calcium oxy chlorid, or of dry hypo-sulfite of soda to one hundred pounds of excelsior will effect the desired result. The soda or other dry absorbent is preferably sifted onto the excelsior while the latter is being baled and, being capable of absorbing its weight in moisture, will condition the excelsior to prevent growth of mold and must germs and reduce the bacteria count.

The particular mechanism for accomplishing the desired result is unimportant in so far as this particular application is concerned. The hypo-sulfite of soda may be manually sifted over the excelsior as it is being fed to the baling press or automatic sifting mechanism may be associated with the baler to apply the soda in proper proportions.

The particular mechanism, however, may constitute the subject matter of a separate application, the essential feature of the invention described in this application being the application of an absorbent over the excelsior to eliminate the formation of mold and must germs to prevent spontaneous combustion and tainting of the food or other products with which the excelsior is used as packing.

What I claim and desire to secure by Letters-Patent is:

1. The method of treating excelsior which consists in applying to the excelsior a substance capable of preventing development of must and mold and subjecting the excelsior to a packing pressure.

2. The method of treating excelsior which consists in sifting in the excelsior a disinfectant substance in a dry state capable of preventing development of must and mold and applying to the excelsior a packing pressure.

3. A packing material consisting of excelsior treated with a substance capable of preventing development of must and mold.

4. A packing material consisting of excelsior treated with a dry, disinfecting substance capable of preventing development of must and mold.

5. A packing material consisting of excelsior treated with a sulfite of soda in a dry state capable of preventing development of must and mold.

6. A packing material consisting of excelsior to which hypo-sulfite of soda has been applied.

In testimony whereof I affix my signature.

BENJAMIN R. BEALL.